June 24, 1930.  J. W. ASHWORTH  1,767,570
ADVERTISING DEVICE
Filed April 8, 1929  2 Sheets-Sheet 1

INVENTOR.
John W. Ashworth
BY
ATTORNEYS.

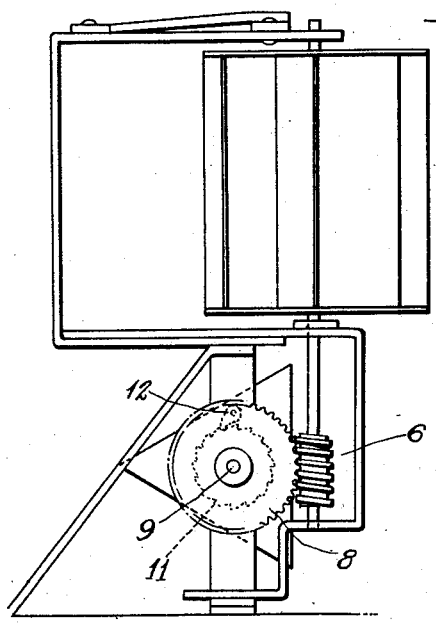
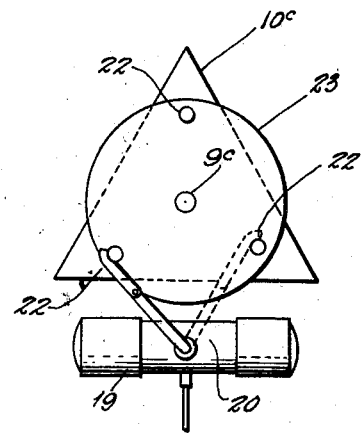
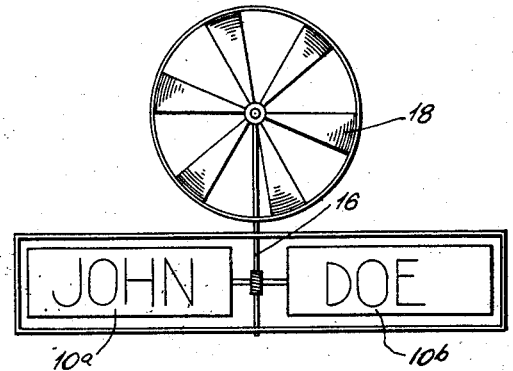

Patented June 24, 1930

1,767,570

UNITED STATES PATENT OFFICE

JOHN W. ASHWORTH, OF NEW YORK, N. Y., ASSIGNOR TO ASHWORTH ADVERTISING COMPANY, INCORPORATED, OF NEW YORK, N. Y., A CORPORATION OF NEW YORK

ADVERTISING DEVICE

Application filed April 8, 1929. Serial No. 353,612.

This invention is an advertising device adapted to be installed in various places and embodying the advantage, among other things, of comprising sufficient novel features to command the attention of casual observers.

It is well recognized in advertising fields that moving parts are particularly adapted to catch and hold the attention and especially so where there is involved an element of mystery as to the means or mechanism whereby the movement is produced.

The device of the present invention is calculated to embody these desirous features and at the same time to utilize certain portions of the moving mechanism as one or more prime movers for the other parts.

Thus, in one practical manner of carrying out the present invention, the device may be mounted either in stationary position upon any suitable part of a building or upon a vehicle, but, in any event, the device is exposed in such manner as to be located in moving currents of air occasioned by natural causes if the device is of the stationary type or by movement of the vehicle if the device is mounted thereon.

The device in this embodiment comprises what may be termed a display element on which suitable advertising media may be printed or otherwise delineated. This element is mounted for movement adapted to be imparted thereto by a suitable wind operated prime mover. For example, one more series of vanes, mounted to rotate under the action of moving air currents, are geared or otherwise operatively connected with the moving element, so that under the influence of such moving air currents, the display element is caused to rotate. This element may have a plurality of faces with one or more of the same or different advertised matter on the several faces which are successively presented to view during the rotation of the element in the manner stated.

Instead of employing a wind operated prime mover, the display element may be connected to any other appropriate prime mover as will hereinafter be more fully explained.

Features of the invention, other than those specified, will be apparent from the hereinafter detailed description and claims, when read in conjunction with the accompanying drawings.

The accompanying drawings illustrate different practical embodiments of the invention, but the constructions therein shown are to be understood as illustrative, only, and not as defining the limits of the invention.

Figure 3 is a side elevation of the structure shown in Figures 1 and 2.

Figures 4 and 5 are front elevations of modified forms of mechanism made in accordance with this invention.

Figure 6 shows a modified form of mechanism for driving the display element intermittently to periodically expose the several faces thereof in succession.

Figure 1:
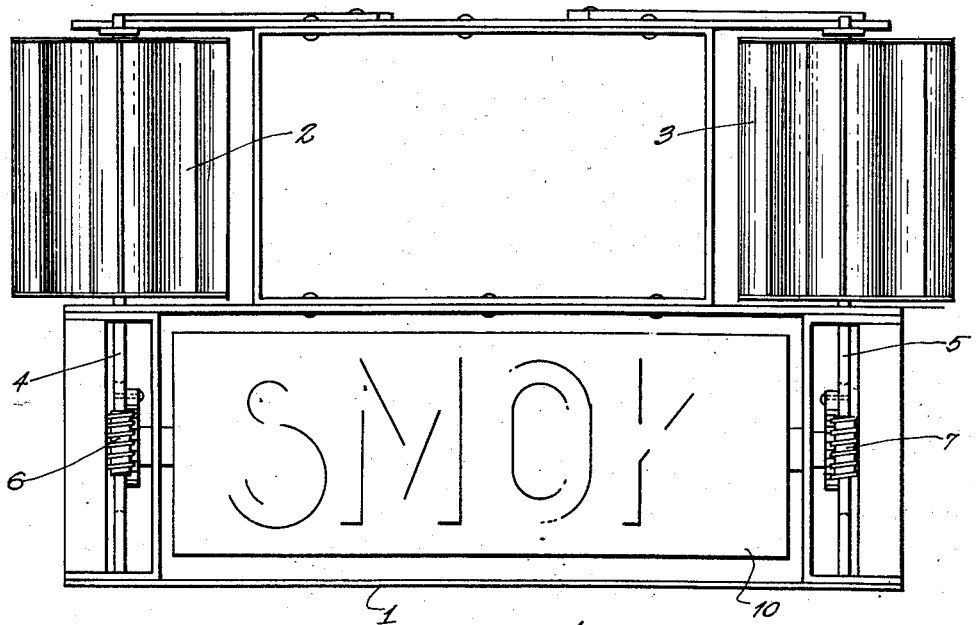
Figure 1 is a front elevation of advertising apparatus embodying the present invention.
Figure 2:
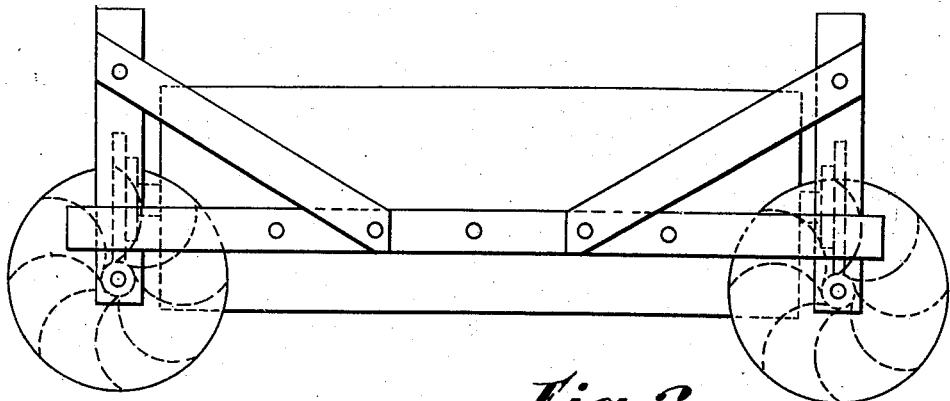
Figure 2 is a plan view of the structure shown in Figure 1.

Referring to the drawings, Figures 1 to 3 show a construction which is adapted to be mounted with advantage upon a motor vehicle, such, for example, as a truck. When so mounted, it may be supported over the driver's enclosure so as to be readily visible by all persons in sight of the truck. I wish it understood, however, that this device may be mounted on a building or in any other suitable locality desired where it will be subjected to moving currents of air in sufficient quantities to normally actuate the device.

As shown in these figures, the device embodies a frame 1, in the upper portion of which are mounted two wind wheels 2 and 3 which are supported on vertical shafts 4 and 5, respectively, suitably journalled in the frame for rotation. To the shafts 4 and 5 are fixed worms 6 and 7, respectively, and with these worms mesh worm wheels 8, as shown in Figure 3.

The worm wheels 8 are mounted to revolve freely on the trunnions 9 which project from the opposite ends of a rotary display element 10. This display element is preferably polygonal in contour and is shown in Figure 3 in the form of a triangular prism although, in practice, it may have any number of sides without departing from the invention. The trunnions 9 extend from the opposite ends of the element and after passing through suitable bearings in the frame 1 extend through the worm wheels 8 and to the outer end of each trunnion is tightly affixed a ratchet wheel 11. A pawl 12, preferably spring actuated, is mounted on each worm wheel 8 and coacts with the corresponding ratchet 11. The pawls 8 at the opposite ends of the display element 10 both act in the same direction so that by this arrangement, there is produced in effect a differential mechanism.

By this mechanism, it is possible for one of the wind wheels 2 or 3 to rotate and drive the display element, while the other wind wheel either remains stationary or rotates at a slower speed. Thus, if the wheel 2 is rotated faster than the wheel 3, the connections at the left hand side of the element, as viewed in Figure 1, will serve to impart rotation to the display element, while the pawl 12 which constitutes a part of the train of driving elements at the right hand side will ride idly over the corresponding ratchet. If the wheel 3 should speed up faster than the wheel 2, the operation will be reversed and the wheel 3 will drive the element 10, while the wheel 2 and its operated mechanism lags behind.

In practice, advertising cards or other suitable advertising matter is delineated upon the several faces of the display element 10, so that as this element rotates, the advertising matter on said several faces of the display element 10 is exposed in succession. The wind wheels are as shown composed of a number of propeller vanes or blades shaped to catch moving air currents and to be rotated thereby and on these vanes advertising matter may also be delineated. In practice, a very attractive arrangement may be obtained by silvering the vanes so that when they are operating in the sunlight, they will act as mirrors to throw long reflected beams in various directions and thus attract and hold the attention.

Figure 4:
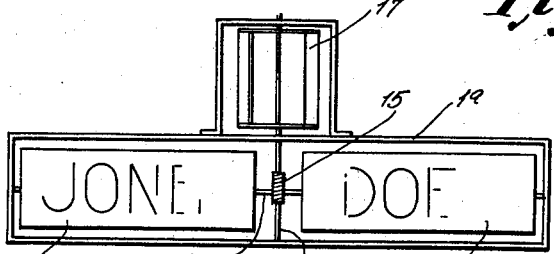

In Figures 4 and 5, the structures illustrated are similar, in many respects, to that of Figures 1 and 2, except that in Figures 4 and 5, two display elements 10ª and 10ᵇ are mounted on one continuous spindle 14 which extends for the full width of the frame 1ª and is suitably journalled for rotation therein. On the spindle between the two display elements 10ª and 10ᵇ is affixed a worm wheel which meshes with a worm 15 secured to a single vertical shaft 16 on which is mounted a single wind wheel 17 of the type shown in Figures 1 and 2, so that in this construction a single wind wheel functions to simultaneously drive both display elements 10ª and 10ᵇ. These elements may be provided with any number of display faces desired.

The structure of Figure 5 is identical with the structure of Figure 4, except that a different type of wind wheel indicated at 18 is utilized to drive the shaft 16 which imparts rotation to the elements 10ª and 10ᵇ.

In the several structures which I have thus far described, relatively moving air currents are utilized to furnish power by which the mechanisms are driven. In practice, however, the device may be actuated by other than wind power. For example, an electric motor may be used or any other suitable source of artificially produced power, although the more economical construction is as by moving air currents as already described. In Figure 6, I have illustrated one form of artificially produced power mechanism. Here the cylinder 19 is of the character generally employed in connection with pneumatic wind shield wipers which are operated by pressure or suction developed in the engine of the vehicle. 20 designates the operating arm which is actuated by a piston within the cylinder 19, so as to oscillate between the extreme positions indicated in full and dotted lines in Figure 6.

The operating arm 20 is preferably jointed as shown at 21, so that when the arm is moved from the full line position of Figure 6 to the dotted line position thereof, the arm will act against one of the pins 22 which is fixed to a disk 23 pivoted on the trunnion 9ᶜ which carries the display element 10ᶜ. During the action of the arm 21 upon one of the pins 22, the pin is moved to rotate the disk 23 through 120 degrees. This corresponds to the operating stroke of the piston in the cylinder 19. The return stroke of the piston is idle and the joint 21 in the arm 20 allows the arm to pass by the next pin 22 in order to get behind such pin preparatory to the next active stroke of the piston. Upon such next active stroke, the operation described is repeated, and the element 10ᶜ is rotated another 120 degrees.

By this arrangement, the display element is periodically turned to expose different faces to view and such element is maintained in stationary position between successive timed operations. The mechanism shown in Figure 6 is particularly adapted for use with the invention when employed on motor vehicles. For stationary use on buildings or in other places, either wind power or an electric or hydraulic prime mover may be employed.

The present invention provides a relatively inexpensive apparatus for mechanical advertising. It immediately commands attention and the space afforded for advertising purposes is relatively extensive. The parts are such that it will not be apt to get out of order and the frame is, in practice, so reinforced and braced as to withstand violent wind pressures without distortion.

In Figures 4 and 5, the two exhibiting elements are shown as mounted on a common shaft and driven through a single worm wheel fixed to the shaft. In practice, however, I may mount these elements on independent shafts and drive them through different wheels so that they will rotate in opposite directions without departing from this invention.

The foregoing detailed description sets forth the invention in its preferred practical form, but the invention is to be understood as fully commensurate with the appended claims.

Having thus fully described the invention, what I claim as new and desire to secure by Letters Patent is:

1. An advertising device embodying a rotary display element provided with a plurality of faces adapted to contain advertising matter and mounted to rotate, two wind wheels mounted to be rotated by moving air currents, separate and independent trains of operating connections between the respective wind wheels and the opposite ends of the display element, whereby said element may be rotated by wind power developed by either wind wheel independently of the other, each train of operating connections comprising a pawl and ratchet which will permit the driving of the display element by the wind wheel which rotates at the highest speed without imposing upon said element the drag incident to the slower speed of the slower wind wheel.

2. An advertising device embodying a rotary display element provided with a plurality of faces adapted to contain advertising matter and mounted to rotate, a supporting trunnion on each end of said element, a ratchet wheel secured to each trunnion, a gear mounted to rotate on each trunnion adjacent each ratchet wheel, a pawl carried by each of said gears and engaging with the corresponding ratchet wheel, a pinion meshing with each gear, a shaft secured to each pinion, and a wind wheel secured to each shaft, whereby the display element is adapted to be driven by either wind wheel independently and to the exclusion of the other as well as by both collectively.

In testimony whereof I have signed the foregoing specification.

JOHN W. ASHWORTH.